Oct. 21, 1958 G. HILDEBRAND 2,856,650
CLOSURE EDGE MOUNTING
Filed July 25, 1955 2 Sheets-Sheet 1

INVENTOR.
George Hildebrand
BY
*John J. Sullivan*
ATTORNEY.

Oct. 21, 1958
G. HILDEBRAND
2,856,650
CLOSURE EDGE MOUNTING
Filed July 25, 1955
2 Sheets-Sheet 2
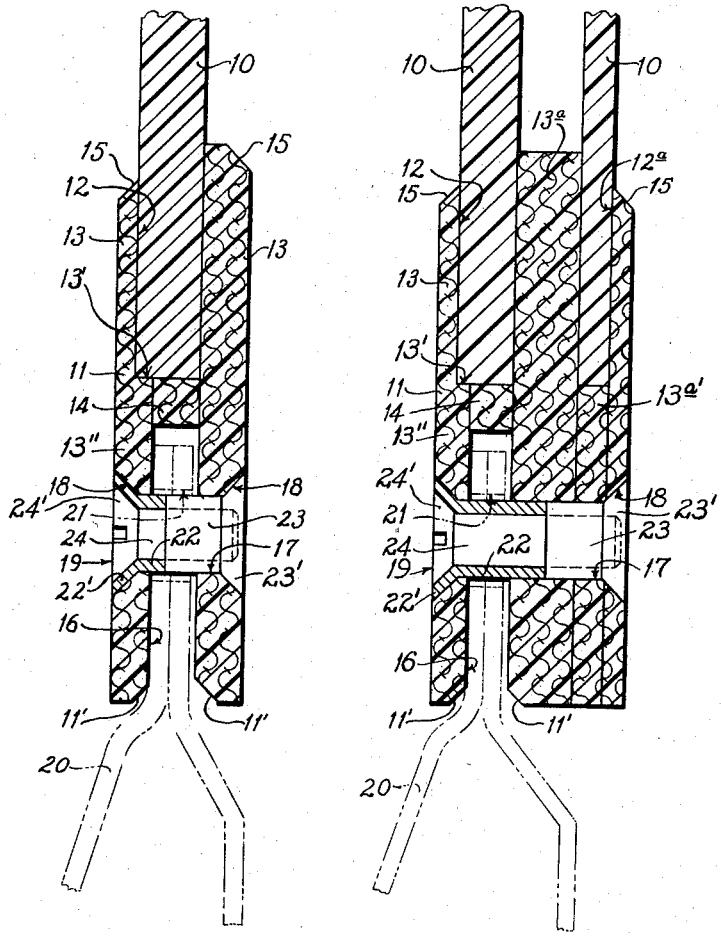
INVENTOR.
George Hildebrand
BY
John J. Sullivan
ATTORNEY.

United States Patent Office 2,856,650
Patented Oct. 21, 1958

2,856,650

CLOSURE EDGE MOUNTING

George Hildebrand, West Hempstead, N. Y., assignor to Republic Aviation Corporation, Farmingdale, N. Y., a corporation of Delaware Application July 25, 1955, Serial No. 523,954

3 Claims. (Cl. 20—56.5)

This invention relates to the construction and mounting of units of transparent, synthetic resins and more particularly to a reinforced edge attachment for a transparent, synthetic resin element or unit, such as, for example, sheets, canopies, panels and other structural aircraft components. The invention proposes an attachment which is secured to and projects from the edge of the transparent unit in such a manner that, for all practical purposes, it becomes an integral part thereof to the end that said unit may be fixedly secured to and mounted on or in an associated frame or structure.

The present invention, among other things, contemplates an improved mounting means for a synthetic resin member or unit by and through which loads and forces acting thereon will be transferred in a single plane directly into the supporting frame or structural aircraft component to which the unit is attached. At the same time the character of the edge attachment or mounting extension of the panel or unit is such that the forces applied in mounting and securing the unit to the frame are confined within the edge attachment or extension and are not dispersed and distributed over and through the unit whereby any tendency of the synthetic resin to fracture or craze is counteracted and thereby eliminated.

Following the teachings of this invention the necessity for routing, notching or otherwise recessing the marginal edge of the resin member or transparent unit, as heretofore practiced in the construction of this type of joints, is unnecessary. Thus, the strength of the unit is not reduced by any material change in its edge thickness.

Among its other objects, the instant invention also has in view a relatively shallow or narrow, reinforced mounting extension, i. e. one in which the overlap of the transparent synthetic resin unit with the reinforced mounting extension is held to a minimum, whereby the transparent characteristic of the synthetic resin is maintained to the fullest degree in the ultimate assembly, thereby giving maximum sight through said unit. This has the added advantage of reducing the weight of the finished or complete assembly.

With the above and other objects in view as will be apparent, this invention consists in the construction, combination and arrangement of parts all as hereinafter more fully described, claimed and illustrated in the accompanying drawings, wherein:

Fig. 2 is a transverse section taken along line 2—2 of Fig. 1 to show the reinforced construction of the mounting extension at and along the edge of the transparent unit and the manner in which it is attached to the associated supporting structure or frame;

Fig. 3 is a similar section, showing a modified form of the proposed reinforced edge attachment as applied to multiple, spaced sheets or panels of transparent synthetic resin.

Figure 1:
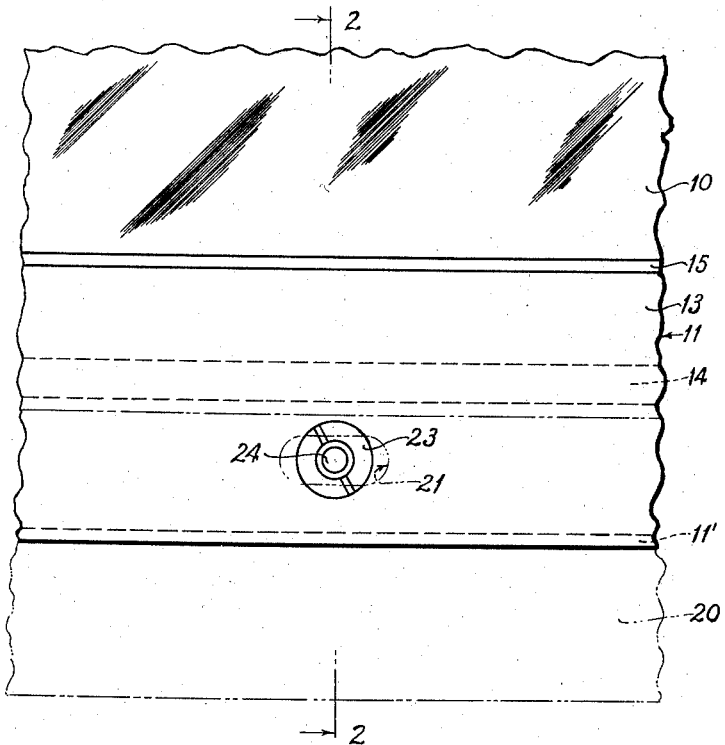
Fig. 1 is a fragmentary elevation of an aircraft component or sheet fabricated from transparent synthetic resin with a mounting extension at the edge thereof, the coacting supporting frame or structural part of the aircraft being shown in phantom lines.

While the present invention may be of general application and use, it finds particular utility in aircraft where transparent synthetic resins have been employed extensively as a substitute for glass. Many constructions have been heretofore proposed in fixedly attaching synthetic resin sheets, panels, canopies and the like to associated supporting frames or structural components of the aircraft. All of these prior means of attachment, however, are proving to be unsatisfactory for use on aircraft designed to operate at sonic or supersonic speeds.

At sonic or supersonic speeds, the pressures and loads imposed upon the aircraft and its components are substantially greater than at lesser speeds. These pressures or loads have always been relatively critical with respect to the transparent closures included in the aircraft structure where the differential in pressure on opposite sides of the closure are marked and frequently set up stresses and unbalanced forces. Moreover, the pressures involved in bolting or otherwise mounting or attaching the transparent unit tend to concentrate at the points of attachment to the supporting structure or frame in which it is mounted. This condition is aggravated by the difference in the coefficients of expansion of the material of the supporting frame and the synthetic resin of the closure.

Generally, satisfactory joints or edge mountings were developed for use in airplanes operating at higher subsonic speeds. These prior joints consisted in bonding a mounting extension of reinforced synthetic resin to the marginal edge of the transparent unit and attaching the mounting extension to the supporting frame or structural aircraft component by bolts or equivalent means. This usually involved routing or otherwise working the edge of the unit, or of the mounting, or both, and sometimes the use of a cap piece to, in effect, replace the material removed and reinforce the connection between the mounting extension and the transparent unit. With airplanes attaining supersonic speeds the joints or edge mountings heretofore employed proved to be no longer adequate, as they did not entirely withstand the additional loads and pressures imposed at these higher speeds. It was proposed to enlarge, thicken or otherwise strengthen the transparent material of the closure unit adjacent the marginal edge attachment, but this expedient developed eccentric or unbalanced stresses or forces in the joint or edge attachment which acted adversely on the closure assembly.

Additionally, the increased pressures and loads imposed on aircraft components by the increasing speeds has resulted in the development of new transparent synthetic resins having greater tensile strength and resistance to the high temperatures due to air friction. Examples of such synthetic resins are "Sierracin" which is the trade-name of a resin made and sold by Sierracin Corporation and "Gafite" which is the trade-name of a resin produced by General Aniline and Film Corporation. "Gafite" is a modified acrylic resin (polymethyl-alpha-chloroacrylate) while "Sierracin" is a polyester resin, both being thermosetting resins and are obtainable on the open, commercial market. These synthetic resins are more sensitive to routing or notching than the earlier acrylic resins and, therefore, do not lend themselves to the prior joint constructions requiring the formation or working of the marginal edge of the resin panel by these or similar operations.

The present invention proposes a mounting extension which transfers the loads imposed on the transparent synthetic resin panel or closure unit directly into the associated frame or structural aircraft component through a single plane. In this way the strength of the joint is made independent of the thickness of the panel material. Furthermore, all eccentric forces or loads between the synthetic resin unit and the structural component or supporting frame have been removed by the instant attachment to the end that the synthetic resin of the closure unit is capable of withstanding greater loads and pressures.

Moreover, the construction of the present joint is such that routing, notching and otherwise cutting the marginal edge of the synthetic resin is unnecessary. This not only is desirable where "Sierracin" or "Gafite" and similar materials are employed, but also simplifies fabrication and mounting of the transparent resin unit and the sealing of the ultimate joint regardless of the synthetic resin used.

The difference in the coefficients of expansion of the synthetic resin, on the one hand, and of the material of the structural component or supporting frame on the other hand, is so compensated for in the present edge attachment or mounting joint that the transparent closure unit is not adversely affected thereby. With the present edge attachment, oversized holes or elongated slots to compensate for the difference in the coefficients of expansion of the material are provided in the supporting frame or the structural component for the reception of the bolts or other attaching means that also pierce the attaching extension. Thus, it is unnecessary to weaken the reinforced mounting extension by providing oversized holes or slots for the passage of bolts or other attaching means.

Referring more particularly to the drawings, 10 designates a unit such as a sheet, panel or other aircraft component, of transparent synthetic resin of the type suitable for aircraft closures. An edge mounting member or extension 11, formed of multiple layers of suitable reinforcing material or fabric, laminated with the same resin as that of the unit or a resin having the same characteristics as that of the unit, spans and is cemented to the marginal edge of said unit 10. For this purpose, a coextensive groove or socket 12 is formed or produced in one edge of the mounting extension 11 to receive the margin of the unit 10. When the margin of the unit 10 is thus disposed within the socket 12, the opposed surfaces of the unit rest flush against the inner surfaces of the mounting extension 11 defining the socket 12 and these surfaces are bonded together by a compatible cement to create a homogeneous body. This cement can be a solution of the same resin as that employed in the unit 10 and edge extension 11 so that, upon the evaporation of the solvent of the cement, a single homogeneous unitary structure is produced at the edge of the unit.

The formation of the mounting member or extension 11 is such that a pair of integral spaced arms 13 is created to define the aforesaid socket 12. These spaced arms 13 on the edge attachment or extension 11 define the marginal groove or socket 12, which is substantially equal in width to the thickness of the unit 10, and overlap the opposed surfaces of the margin of this unit 10.

A spacer 14, made of the same material as the remainder of the extension 11 is disposed between the arms 13 and is integrally bonded to the adjacent surfaces thereof to form the base of the socket 12. This spacer 14 abuts and can be cemented to the edge of the unit 10.

The ends of each of the spaced arms 13 may, if desired, be beveled, tapered or chamfered, as at 15. The chamfer or taper 15 on the end of the arm 13 that is to be disposed externally of the unit 10 and in the airstream, is considered important, as it reduces projection of the extension 11 to an appreciable degree and accordingly reduces potential drag. Hence, the angle of the bevel 15 of the arm 13 on the exterior of the unit 10 forms, in effect, a substantially smooth and uninterrupted continuation of the surface of such unit.

The outer arm 13 of the extension 11 has less thickness than its companion arm whereby it rests flush against the outer surface of the unit 10, but at and beyond the spacer 14 has a shoulder 13' which extends under the edge of the unit 10 abuts the spacer 14 to which it is bonded or cemented. Thus, that portion 13" of the outer arm 13 of the extension 11 projecting beyond the edge of the unit 10 is substantially thicker than the part of the arm 13 overlying and cemented to the marginal surface of the unit 10 of which it forms a continuation and is coextensive.

While the outer surfaces of the spaced arms 13 are shown straight or parallel one to the other, in some applications of the invention it may be desirable to increase the length of the bevels or chamfers 15 and thereby reduce the angles thereof. This can be accomplished either by trimming the edges of the arms 13 adjoining the unit 10 to the desired angle for the bevels or chamfers 15, or by changing the lengths of the fabric layers laminated into the arms 13 during the fabrication of the extension 11. In doing this, each lamination, or group of laminations, is terminated short of the edge of the next adjacent lamination in the direction of the unit 10. Thus, the several fabric laminations overlying the margin of the unit 10 are progressively shorter outwardly from said unit. In this manner, the bevels or chamfers 15 of the arms 13, as shown, in effect, would be replaced by longer, outwardly and downwardly sloping surfaces. Such a construction would result in a more flexible joint which is weaker in tensile strength but stronger fatiguewise.

The spacing of the arms 13 of the mounting member 11 establishes a marginal socket 16 in opposition to and alignment with the socket 12 that is defined at its sides by the inner surfaces of the spaced arms 13, and at its bottom by the outer surface of the spacer 14. By this arrangement, the socket 16 is opposed to, and in substantial alignment with, the edge of the unit 10. Thus, the opposed sockets 12 and 16 of the mounting member 11 are disposed in substantial alignment throughout their respective lengths and are separated one from the other by the spacer 14, which forms the bottom of each socket. The mounting extension 11 thus has an H-shaped cross-section.

A number of spaced holes 17 pierce the arms 13 of the mounting extension 11 below the spacer 14 and beyond the edge of the unit. These holes 17 are preferably situated at points approximately half-way between the edge of the extension 11 and said spacer 14 and are aligned one with the other transversely of the socket 16. The outer end of each of the holes 17 is countersunk, as at 18, to receive and mate the heads of the associated attachment assembly 19. These attaching assemblies 19 serve to connect the reinforced edge mounting extension 11 to a supporting frame or structural component 20.

To this end, the edge of the frame or component 20 is disposed within the socket 16 and a plurality of elongated, oversized slots or apertures 21 is provided therein, one to register with each set of transversely aligned holes 17 in the arms 13 on the sides of the socket 16. In assembling the unit 10 with the mounting extension 11 fixedly and permanently attached thereto with the supporting frame or structural component 20, an attaching assembly 19 is passed through each set of registered apertures 17 and the associated slot 21, thereby securing the unit 10 and its mounting extension 11 to the supporting frame or component 20.

It is noted that the thickness of that portion of the frame 20 disposed within the socket 16 is somewhat less than the thickness of the socket 16. Also, the slots 21 in the supporting frame or component 20 are such that the inner end of said frame or component 20 is maintained at all times in spaced relationship relative to the bottom 14 of the socket 16.

In order that the flexibility of the joint be increased, the outer edge of each element 13 defining the socket 16 therein is chamfered, as at 11'. This serves to permit relative lateral movement between the supporting frame 20 and the resin mounting extension 11 without a chipping, crazing or fracture of the extension.

Any suitable attaching means 19 may be employed to secure the mounting extension 11 of the unit 10 to the supporting frame or structural component; however, a preferred form of such assembly is shown and described. Each attaching assembly 19 consists of a bushing 22 having a flared end 22' designed and adapted to be matingly seated in the countersunk end of an aperture or hole 17 on one side of the socket 16. An internally threaded nut 23, which also serves as a bushing in continuation of the bushing 22, and similar in shape and design to the bushing 22, is adapted to be similarly positioned in the corresponding hole 17 in the opposite side of the socket 16. This nut 23 is provided with a head 23' that is seated in the countersunk end of such corresponding hole 17. The length of the bushing 22, combined with its coacting nut 23, is such that when they are disposed in holes 17 of the mounting extension 11, their inner or adjacent ends abut and thereby serve to maintain the spaced relationship between the arms 13 disposed on opposite sides of the socket 16. A screw or bolt 24 having a head 24' which conforms in size and shape to the shape and area of the flared end of the bushing 22 is threaded into the nut 23 from the external or airstream side of the mounting extension 11. The nut and the bushing are thereby secured one to the other to become, in effect, a single, unitary bushing with the outer ends thereof resting flush within the outer surfaces of the arms 13 of the mounting extension.

From the foregoing it is apparent that when the edge of the supporting frame 20 is disposed within the socket 16 in and along the edge of the mounting extension 11 with each slot 21 thereof registered with a pair of corresponding holes 17 in the extension 11 and the attaching assembly secured therein, the unit 10 is fixedly connected to the frame 20. At the same time, due to the comparatively snug fit of the bushings 22 and nuts 23 in the holes 17 and the slots 21, all vertical relative movement between the unit 10 and the supporting frame 20 is, to a great extent, eliminated. However, due to the form of each slot 21 and the difference in thickness between that part of the supporting frame 20 within the socket 16 and the width of said socket, variations in the coefficients of expansion between the material of the frame 20 and the resin of the unit 10, including its mounting extension 11, are accommodated and compensated for. Thus, the supporting frame 20 and the resin unit 10 and extension 11 thereof are permitted to expand and contract at different rates without causing the resin to craze, crack or fracture. Yet, for all practical purposes, the resin unit 10 is fixedly mounted to the metal frame 20.

It is also to be noted that, since the elongated, oversized slots 21 are provided only in the frame 20 and the holes 17 in the mounting extension 11 snugly engage the bushing 22 and nut 23, little or no air can escape through the openings housing the attaching assemblies 19. If a tighter seal is desired or required in this area, standard sealants may be employed on and around the bushings 22 and nuts 23. Moreover, well-known seals of resilient and flexible material may be employed around the edge of the mounting extension 11 adjacent the outer edge or end of the socket 16 between the extension 11 and the supporting frame 20. This elimination of the escape of air is only important where the cockpit or other area within the fuselage is pressurized.

In the form of the invention illustrated in Fig. 3, the mounting extension 11 has been adapted to accommodate a double glazing, i. e. two spaced transparent units 10, as may be employed in some present-day aircraft canopies.

In this construction, the inner arm 13 of the mounting extension 11 has been built up with additional laminations of reinforcing material whereby a substantially thicker arm is created. An additional socket or groove 12a is formed or produced in the mounting extension 11 in the same manner as the socket 12 to receive a second unit 10.

As in the joint shown in Fig. 2, the arms 13 of the reinforced extension 11 are provided with shoulders on their surfaces which extend under the edge of the units 10. In the joint of Fig. 3, that portion or arm 13a of the mounting extension 11 is disposed between the transparent units 10, as a separator, and the bottom of the groove or socket 12a comprises a shoulder 13a' on the innermost arm 13 of the extension 11.

Figure 4:
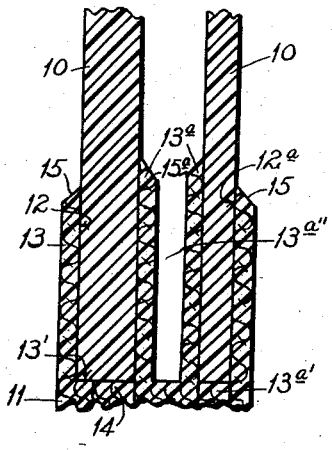
Fig. 4 is a modified form of the mounting extension illustrated in Fig. 3 to show a different construction thereof to receive the marginal edge of the transparent unit.

Additionally, in applications where a more flexible joint is desired or required, the arm or separator 13a (Fig. 3) may be relieved or formed with a groove 13a'' (Fig. 4). This groove 13a'' can be formed or produced in the reinforced mounting extension 11 in the same manner as the arms 13, and more particularly the bevels, tapers or chamfers 15, as hereinbefore described. Thus, the outer ends of the arm or separator 13a defining the groove or relief 13a'' may be beveled, chamfered or tapered, as at 15a, which, for all intents and purposes, conform and correspond to the bevels or chamfers 15, as described. The depth of the relief 13a'', of course, would be determined by the degree of flexibility desired of the joint in the particular application.

What is claimed is:

1. An edge mounting for the attachment of a sheet of transparent material to a supporting structure comprising a reinforced laminated member having the same general characteristics as said sheet, said member having an H-shaped cross-section formed by spaced arms separated centrally by a spacer integral therewith, the arms on one side of said spacer snugly receiving therebetween the marginal edge of said sheet to be integrally bonded thereto and to the adjacent surface of the spacer and thereby form a homogeneous unit, the arms on the other side of said spacer being adapted to receive and accommodate the marginal edge of the supporting structure, bolt and nut means piercing the arms on said other side of the spacer and the supporting structure disposed therebetween for the interconnection thereof, and a removable spacer disposed on said bolt between the opposed ends thereof to limit the tightening of the nut thereon.

2. And edge mounting for the attachment of two sheets of transparent material to a supporting structure comprising a reinforced laminated member having the same general characteristics as each sheet, said member having one marginal edge portion formed by a pair of spaced arms defining a groove and the opposed marginal edge portion formed by at least three spaced arms defining a pair of sockets, said groove being in substantial alignment with and separated from one of said sockets by an integral spacer, the groove being adapted to receive and accommodate the marginal edge of the supporting structure and each socket snugly receiving therein the marginal edge of one of said sheets to be integrally bonded thereto and to the adjacent surface of the spacer to thereby form a homogeneous unit, bolt and nut means piercing said pair of spaced arms and the supporting structure disposed in said groove for the interconnection thereof, and a removable spacer disposed on said bolt between the opposed ends thereof to limit the tightening of the nut thereon.

3. An edge mounting for the attachment of at least one sheet of transparent material to a supporting structure comprising a reinforced laminated member having the same general characteristics as each sheet, said member having one marginal edge portion formed by a pair of spaced arms defining a groove and the opposed marginal edge portion formed by a plurality of spaced arms with a socket between adjacent arms, the groove defined by said pair of spaced arms being in substantial alignment with and separated from a socket in said opposed marginal edge portion by an integral spacer, said pair of arms being adapted to receive and accommodate the marginal edge of the supporting structure and the arms on said other marginal edge portion snugly receiving therebetween the marginal edge of a sheet to be integrally bonded thereto and to the adjacent surface of the spacer to thereby form a homogeneous unit, bolt and nut means piercing said pair of arms and the supporting structure disposed therebetween for the interconnection thereof, and a removable spacer disposed on said bolt between the opposed ends thereof to limit the tightening of the nut thereon.

References Cited in the file of this patent

UNITED STATES PATENTS

| | | |
|---|---|---|
| 1,967,039 | Mohr | July 17, 1934 |
| 2,511,168 | Martin et al. | June 13, 1950 |
| 2,587,063 | Petsch | Feb. 26, 1952 |
| 2,683,678 | Adams | July 13, 1954 |

FOREIGN PATENTS

| | | |
|---|---|---|
| 534,439 | Great Britain | Mar. 6, 1941 |